United States Patent
Wong et al.

(10) Patent No.: US 8,548,671 B2
(45) Date of Patent: Oct. 1, 2013

(54) METHOD AND APPARATUS FOR AUTOMATICALLY CALIBRATING VEHICLE PARAMETERS

(75) Inventors: Lisa Wong, Auckland (NZ); Andrew Evan Graham, Waitakere (NZ); Christopher W. Goode, Auckland (NZ)

(73) Assignee: Crown Equipment Limited, Auckland (NZ)

(*) Notice: Subject to any disclaimer, the term of this patent is extended or adjusted under 35 U.S.C. 154(b) by 169 days.

(21) Appl. No.: 13/153,743

(22) Filed: Jun. 6, 2011

(65) Prior Publication Data

US 2012/0310468 A1    Dec. 6, 2012

(51) Int. Cl.
| | |
|---|---|
| G01M 17/00 | (2006.01) |
| G06F 7/00 | (2006.01) |
| G06F 11/30 | (2006.01) |
| G06F 19/00 | (2011.01) |
| G07C 5/00 | (2006.01) |

(52) U.S. Cl.
USPC ........ 701/29.1; 701/29.7; 701/30.2; 701/30.3; 701/30.4

(58) Field of Classification Search
USPC ........................................................ 701/29.1
See application file for complete search history.

(56) References Cited

U.S. PATENT DOCUMENTS

| | | | |
|---|---|---|---|
| 4,855,915 A | 8/1989 | Dallaire | |
| 4,858,132 A | 8/1989 | Holmquist | |
| 5,011,358 A | 4/1991 | Andersen et al. | |
| 5,051,906 A | 9/1991 | Evans, Jr. et al. | |
| 5,170,352 A | 12/1992 | McTamaney et al. | |
| 5,202,832 A | 4/1993 | Lisy | |
| 5,471,393 A | 11/1995 | Bolger | |
| 5,491,670 A | 2/1996 | Weber | |
| 5,539,638 A * | 7/1996 | Keeler et al. | 701/32.9 |
| 5,568,030 A | 10/1996 | Nishikawa et al. | |
| 5,586,620 A | 12/1996 | Dammeyer et al. | |
| 5,612,883 A | 3/1997 | Shaffer et al. | |
| 5,646,845 A | 7/1997 | Gudat et al. | |
| 5,682,317 A * | 10/1997 | Keeler et al. | 701/101 |
| 5,916,285 A | 6/1999 | Alofs et al. | |
| 5,941,935 A * | 8/1999 | Fernandez | 701/507 |

(Continued)

FOREIGN PATENT DOCUMENTS

| | | |
|---|---|---|
| DE | 19757333 C1 | 9/1999 |
| DE | 10220936 A1 | 12/2003 |

(Continued)

OTHER PUBLICATIONS

Farouk Azizi and Nasser Houshangi (2011). Mobile Robot Position Determination, Recent Advances in Mobile Robotics, Dr. Andon Topalov (Ed.), ISBN: 978-953-307-909-7, InTech, Available from: http://www.intechopen.com/books/recent-advances-in-mobile-robotics/mobile-robot-position-determination.*

(Continued)

*Primary Examiner* — Khoi Tran
*Assistant Examiner* — Nicholas Kiswanto
(74) *Attorney, Agent, or Firm* — Dinsmore & Shohl LLP (57) ABSTRACT

A method and apparatus for automatically calibrating vehicle parameters is described. In one embodiment, the method includes measuring a parameter value during vehicle operation; comparing the measured parameter value to an actual parameter value to identify at least one vehicle parameter bias as an actual measurement error; and modifying at least one vehicle parameter based on the at least one vehicle parameter bias.

14 Claims, 5 Drawing Sheets

(56) References Cited

U.S. PATENT DOCUMENTS

| | | | |
|---|---|---|---|
| 5,961,571 | A | 10/1999 | Gorr et al. |
| 6,012,003 | A | 1/2000 | Astrom |
| 6,092,010 | A | 7/2000 | Alofs et al. |
| 6,208,916 | B1 | 3/2001 | Hori |
| 6,246,930 | B1 | 6/2001 | Hori |
| 6,308,118 | B1 | 10/2001 | Holmquist |
| 6,470,300 | B1* | 10/2002 | Benzinger et al. ............ 702/190 |
| 6,539,294 | B1 | 3/2003 | Kageyama |
| 6,592,488 | B2 | 7/2003 | Gassmann |
| 6,917,839 | B2 | 7/2005 | Bickford |
| 6,952,488 | B2 | 10/2005 | Kelly et al. |
| 7,148,458 | B2 | 12/2006 | Schell et al. |
| 7,162,056 | B2 | 1/2007 | Burl et al. |
| 7,162,338 | B2 | 1/2007 | Goncalves et al. |
| 7,177,737 | B2 | 2/2007 | Karlsson et al. |
| 7,272,467 | B2 | 9/2007 | Goncalves et al. |
| 7,343,232 | B2 | 3/2008 | Duggan et al. |
| 7,386,163 | B2 | 6/2008 | Sabe et al. |
| 7,451,021 | B2* | 11/2008 | Wilson ............................. 701/9 |
| 7,539,563 | B2 | 5/2009 | Yang et al. |
| 7,646,336 | B2 | 1/2010 | Tan et al. |
| 7,679,532 | B2 | 3/2010 | Karlsson et al. |
| 7,688,225 | B1 | 3/2010 | Haynes et al. |
| 7,689,321 | B2 | 3/2010 | Karlsson |
| 7,720,554 | B2 | 5/2010 | DiBernardo et al. |
| 7,734,385 | B2 | 6/2010 | Yang et al. |
| 7,844,364 | B2 | 11/2010 | McLurkin et al. |
| 7,996,097 | B2 | 8/2011 | DiBernardo et al. |
| 8,020,657 | B2 | 9/2011 | Allard et al. |
| 8,050,863 | B2 | 11/2011 | Trepagnier et al. |
| 8,103,383 | B2 | 1/2012 | Nakamura |
| 8,126,642 | B2 | 2/2012 | Trepagnier et al. |
| 8,150,650 | B2 | 4/2012 | Goncalves et al. |
| 8,204,679 | B2 | 6/2012 | Nakamura |
| 8,255,107 | B2 | 8/2012 | Yang et al. |
| 8,280,623 | B2 | 10/2012 | Trepagnier et al. |
| 8,296,065 | B2* | 10/2012 | Haynie et al. ................ 701/505 |
| 2002/0049530 | A1 | 4/2002 | Poropat |
| 2004/0030493 | A1 | 2/2004 | Pechatnikov et al. |
| 2004/0202351 | A1 | 10/2004 | Park et al. |
| 2004/0249504 | A1 | 12/2004 | Gutmann et al. |
| 2005/0149256 | A1 | 7/2005 | Lawitzky et al. |
| 2005/0182518 | A1 | 8/2005 | Karlsson |
| 2006/0181391 | A1 | 8/2006 | McNeill et al. |
| 2006/0184013 | A1 | 8/2006 | Emanuel et al. |
| 2007/0061043 | A1 | 3/2007 | Ermakov et al. |
| 2007/0090973 | A1 | 4/2007 | Karlsson et al. |
| 2007/0106465 | A1 | 5/2007 | Adam et al. |
| 2007/0150097 | A1 | 6/2007 | Chae et al. |
| 2007/0153802 | A1 | 7/2007 | Anke et al. |
| 2007/0262884 | A1 | 11/2007 | Goncalves et al. |
| 2009/0005986 | A1 | 1/2009 | Soehren |
| 2009/0140887 | A1 | 6/2009 | Breed et al. |
| 2009/0216438 | A1 | 8/2009 | Shafer |
| 2010/0161224 | A1 | 6/2010 | Lee et al. |
| 2010/0222925 | A1 | 9/2010 | Anezaki |
| 2010/0256908 | A1 | 10/2010 | Shimshoni et al. |
| 2010/0268697 | A1 | 10/2010 | Karlsson et al. |
| 2011/0010023 | A1 | 1/2011 | Kunzig et al. |
| 2011/0121068 | A1 | 5/2011 | Emanuel et al. |
| 2011/0125323 | A1 | 5/2011 | Gutmann et al. |
| 2011/0150348 | A1 | 6/2011 | Anderson |
| 2011/0153338 | A1 | 6/2011 | Anderson |
| 2011/0218670 | A1 | 9/2011 | Bell et al. |
| 2011/0230207 | A1 | 9/2011 | Hasegawa |
| 2012/0035797 | A1 | 2/2012 | Oobayashi et al. |
| 2012/0101784 | A1* | 4/2012 | Lindores et al. ................ 703/2 |
| 2012/0191272 | A1 | 7/2012 | Andersen et al. |
| 2012/0323431 | A1 | 12/2012 | Wong et al. |
| 2013/0006420 | A1 | 1/2013 | Karlsson et al. |

FOREIGN PATENT DOCUMENTS

| | | | |
|---|---|---|---|
| DE | 10234730 | A1 | 2/2004 |
| DE | 102007021693 | A1 | 11/2008 |
| EP | 1732247 | A1 | 12/2006 |
| GB | 2389947 | A | 12/2003 |
| JP | 60067818 | A | 4/1985 |
| JP | 2002048579 | A | 2/2002 |
| JP | 2002108446 | A | 4/2002 |
| JP | 2005114546 | A | 4/2005 |
| WO | 03096052 | A2 | 11/2003 |
| WO | WO 2011/044298 | A2 | 4/2011 |

OTHER PUBLICATIONS

J. Feng, S. Megerian, M. Potkonjak. Model-based calibration for sensor networks. Sensors, 2003. Proceedings of IEEE (vol. 2). pp. 737-742. Print ISBN: 0-7803-8133-5.*

U.S. Appl. No. 13/116,600, filed May 26, 2011, entitled: "Method and Apparatus for Providing Accurate Localization for an Industrial Vehicle", Lisa Wong et al., 47 pages.

"Unmanned Tracked Ground Vehicle for Natural Environments", J. Ibañez-Guzmán, X. Jian, A. Malcolm and Z. Gong, Singapore Institute of Manufacturing Technology, Singapore, Chun Wah Chan, Defense Science and Technology Agency, Singapore, and Alex Tay, Nanyang Technological University, School of Computer Science, Singapore, no date, 9 pages.

"Vision Based Global Localization for Intelligent Vehicles", T.K. Xia, M. Yang, and R.Q. Yang, Research Institute of Robotics, Automation Department, Shanghao Jiao Tong University, P.R. China, Intelligent Vehicles Symposium in Tokyo Japan, Jun. 13-15, 2006, 6 pages.

Office Action from U.S. Appl. No. 13/159,501 mailed Jan. 10, 2013.

Office Action from U.S. Appl. No. 12/660,616 mailed Nov. 27, 2012.

"Three Engineers, Hundreds of Robots, One Warehouse," Guizzo, IEEE Spectrum, Jul. 2008.

Office Action from U.S. Appl. No. 13/116,600 mailed Dec. 31, 2012.

Search Report/Written Opinion from PCT/NZ2012/000051 mailed Jan. 2, 2013.

Search Report/Written Opinion from PCT/NZ2012/000091 mailed Oct. 31, 2012.

Search Report/Written Opinion from PCT/US2012/054062 mailed Nov. 27, 2012.

Search Report/Written Opinion from PCT/US2012/052247 mailed Nov. 27, 2012.

Office Action mailed May 8, 2013 from U.S. Appl. No. 13/672,260, filed Nov. 8, 2012.

Office Action mailed Jun. 4, 2013 from U.S. Appl. No. 13/159,501, filed Jun. 14, 2011.

Office Action mailed May 21, 2013 from U.S. Appl. No. 12/718,620, filed Mar. 5, 2010.

Office Action mailed Jul. 12, 2013 from U.S. Appl. No. 13/227,165, filed Sep. 7, 2011.

International Search Report and Written Opinion pertaining to International Patent Application No. PCT/NZ2012/000084, dated Jan. 30, 2013.

Borenstein et al. "Mobile Robot Positioning—Sensors and Techniques", Journal of Robotic Systems, Special Issue on Mobile Robots, vol. 14, No. 4, pp. 231-249, Apr. 1997.

Harmon et al., "A Technique for Coordinating Autonomous Robots", Autonomous Systems Branch Naval Ocean Systems Center San Diego, CA 92152, 1986.

Jansfelt et al., "Laser Based Position Acquisition and Tracking in an Indoor Environment", Proc. Int. Symp. Robotics and Automation, 1998.

Siadat et al., "An Optimized Segmentation Method for a 2D Laser-Scanner Applied to Mobile Robot Navigation", Proceedings of the 3rd IFAC Sympo9sium on Intelligent Components and Instruments for Control Applications, 1997.

Office Action pertaining to U.S. Appl. No. 13/159,500, dated Mar. 26, 2013.

Office Action pertaining to U.S. Appl. No. 13/219,271, dated Feb. 25, 2013.

Office Action from U.S. Appl. No. 12/948,358 mailed Apr. 8, 2013.

* cited by examiner

METHOD AND APPARATUS FOR AUTOMATICALLY CALIBRATING VEHICLE PARAMETERS

BACKGROUND

1. Technical Field

Embodiments of the present invention generally relate to environment based navigation systems for industrial vehicles and, more specifically, to a method and apparatus for automatically calibrating vehicle parameters.

2. Description of the Related Art

Entities regularly operate numerous facilities in order to meet supply and/or demand goals. For example, small to large corporations, government organizations and/or the like employ a variety of logistics management and inventory management paradigms to move objects (e.g., raw materials, goods, machines and/or the like) into a variety of physical environments (e.g., warehouses, cold rooms, factories, plants, stores and/or the like). A multinational company may build warehouses in one country to store raw materials for manufacture into goods, which are housed in a warehouse in another country for distribution into local retail markets. The warehouses must be well-organized in order to maintain and/or improve production and sales. If raw materials are not transported to the factory at an optimal rate, fewer goods are manufactured. As a result, revenue is not generated for the unmanufactured goods to counterbalance the costs of the raw materials.

Unfortunately, physical environments, such as warehouses, have several limitations that prevent timely completion of various tasks. Warehouses and other shared use spaces, for instance, must be safe for a human work force. Some employees operate heavy machinery and industrial vehicles, such as forklifts, which have the potential to cause severe or deadly injury. Nonetheless, human beings are required to use the industrial vehicles to complete tasks, which include object handling tasks, such as moving pallets of goods to different locations within a warehouse. Most warehouses employ a large number of forklift drivers and forklifts to move objects. In order to increase productivity, these warehouses simply add more forklifts and forklift drivers.

In order to mitigate the aforementioned problems, some warehouses utilize equipment for automating these tasks. As an example, these warehouses may employ automated industrial vehicles, such as forklifts, to carry objects on paths. When automating an industrial vehicle, a key requirement is the ability to accurately locate the vehicle in the warehouse. To achieve such location, a plurality of sensors are frequently used to measure the position. However, it is necessary to account for uncertainty and noise associated with the sensor measurements. For example, vehicle parameters (e.g., wheel diameter) change over time due to various reasons, such as wear and tear, seasonal conditions and/or the like. Vehicle parameter changes can cause inaccuracies with sensor device measurements, which are reflected as a bias, for example, during vehicle pose prediction. Without calibration, the automated vehicle will continue to perform localization and mapping using vehicle parameters which no longer reflect the state of the vehicle, causing significant errors in automated industrial vehicle navigation and operation.

Therefore, there is need in the art for a method and apparatus for automatically calibrating vehicle parameters to enhance automated industrial vehicle navigation.

SUMMARY

Various embodiments of the present disclosure generally comprise a method and apparatus for automatically calibrating vehicle parameters. In one embodiment, the method includes measuring a parameter value during vehicle operation; comparing the measured parameter value to an actual parameter value to identify at least one vehicle parameter bias as an actual measurement error; and modifying at least one vehicle parameter based on the at least one vehicle parameter bias.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
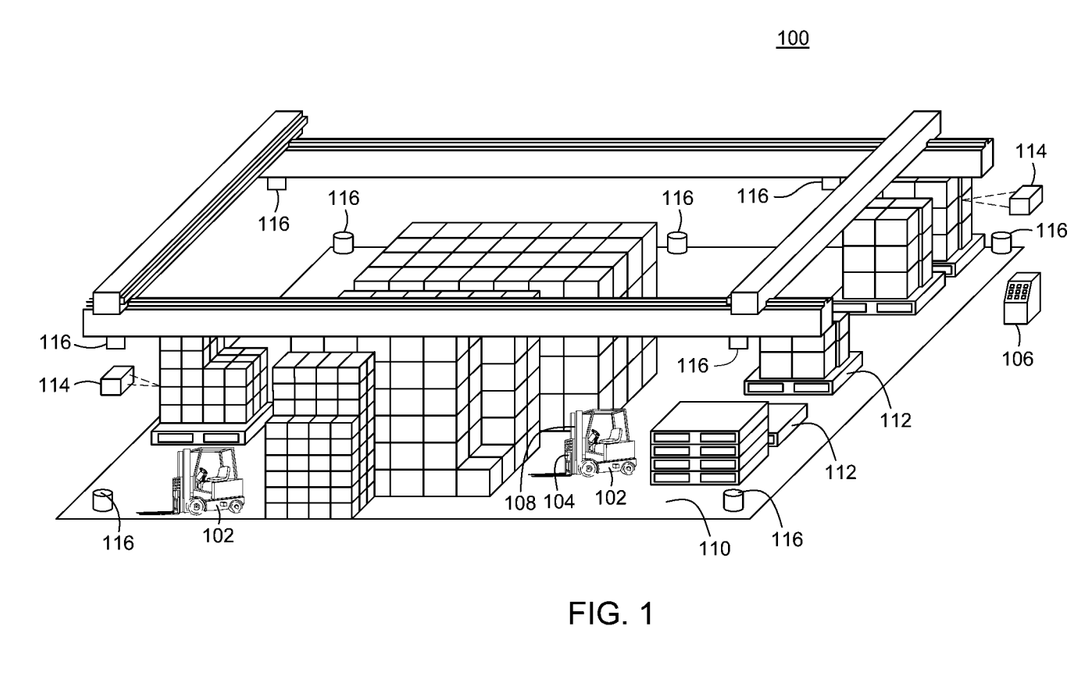
FIG. 1 is a perspective view of a physical environment comprising various embodiments of the present disclosure.

FIG. 1 illustrates a schematic, perspective view of a physical environment 100 comprising one or more embodiments of the present invention.

In some embodiments, the physical environment 100 includes a vehicle 102 that is coupled to a mobile computer 104, a central computer 106 as well as a sensor array 108. The sensor array 108 includes a plurality of devices for analyzing various objects within the physical environment 100 and transmitting data (e.g., image data, video data, range map data, three-dimensional graph data and/or the like) to the mobile computer 104 and/or the central computer 106, as explained further below. The sensor array 108 includes various types of sensors, such as encoders, ultrasonic range finders, laser range finders, pressure transducers and/or the like. As explained further below, in one exemplary embodiment, the mobile computer 104 is used to calibrate vehicle parameters that effect navigation of the industrial vehicle 102.

The physical environment 100 further includes a floor 110 supporting a plurality of objects. The plurality of objects include a plurality of pallets 112, a plurality of units 114 and/or the like as explained further below. The physical environment 100 also includes various obstructions (not pictured) to the proper operation of the vehicle 102. Some of the plurality of objects may constitute as obstructions along various paths (e.g., pre-programmed or dynamically computed routes) if such objects disrupt task completion.

The physical environment 100 also includes a plurality of markers 116. The plurality of markers 116 are illustrated as objects attached to a ceiling and the floor 110, but may be located throughout the physical environment 100. In some embodiments, the plurality of markers 116 are beacons that facilitate environment based navigation as explained further below. The plurality of markers 116 as well as other objects around the physical environment 100 form environment features. The mobile computer 104 extracts the environment features and determines an accurate, current vehicle pose.

The physical environment 100 may include a warehouse or cold store for housing the plurality of units 114 in preparation for future transportation. Warehouses may include loading docks to load and unload the plurality of units from commercial vehicles, railways, airports and/or seaports. The plurality of units 114 generally include various goods, products and/or raw materials and/or the like. For example, the plurality of units 114 may be consumer goods that are placed on ISO standard pallets and loaded into pallet racks by forklifts to be distributed to retail stores. The vehicle 102 facilitates such a distribution by moving the consumer goods to designated locations where commercial vehicles (e.g., trucks) load and subsequently deliver the consumer goods to one or more target destinations.

According to one or more embodiments, the vehicle 102 may be an automated guided vehicle (AGV), such as an automated forklift, which is configured to handle and/or move the plurality of units 114 about the floor 110. The vehicle 102 utilizes one or more lifting elements, such as forks, to lift one or more units 114 and then, transport these units 114 along a path to be placed at a designated location. Alternatively, the one or more units 114 may be arranged on a pallet 112 of which the vehicle 102 lifts and moves to the designated location.

Each of the plurality of pallets 112 is a flat transport structure that supports goods in a stable fashion while being lifted by the vehicle 102 and/or another jacking device (e.g., a pallet jack and/or a front loader). The pallet 112 is the structural foundation of an object load and permits handling and storage efficiencies. Various ones of the plurality of pallets 112 may be utilized within a rack system (not pictured). Within a typical rack system, gravity rollers or tracks allow one or more units 114 on one or more pallets 112 to flow to the front. The one or more pallets 112 move forward until slowed or stopped by a retarding device, a physical stop or another pallet 112.

In some embodiments, the mobile computer 104 and the central computer 106 are computing devices that control the vehicle 102 and perform various tasks within the physical environment 100. The mobile computer 104 is adapted to couple with the vehicle 102 as illustrated. The mobile computer 104 may also receive and aggregate data (e.g., laser scanner data, image data and/or any other related sensor data) that is transmitted by the sensor array 108. Various software modules within the mobile computer 104 control operation of the industrial vehicle 102 as explained further below.

In some embodiments, FIG. 1 illustrates an industrial area having forklifts equipped with various sensor devices, such as an encoder, a laser scanner and a camera. As explained further below, the mobile computer 104 calculates a vehicle pose (e.g., position and orientation) using a series of measurements, such as wheel rotations. One or more sensor devices are coupled to the wheels and provide an independent measurement of distance travelled by each of these wheels from which odometry data is calculated. Alternatively, an Inertial Measurement Unit (IMU) may be used to measure odometry data. One or more two-dimensional laser scanners provide details of the physical environment 100 in the form of range readings and their corresponding angles from the vehicle 102. From the laser data, the mobile computer 104 extracts features associated with landmarks, such as straight lines, corners, arcs, markers and/or the like. A camera may provide three-dimensional information including height measurements. Landmarks may also be extracted from the camera data based on various characteristics, such as color, size, depth, position, orientation, texture and/or the like, in addition to the extracted features.

Using a filter (e.g., an Extended Kalman Filter (EKF)), the mobile computer 104 models the pose of the vehicle in the two-dimensional plane (i.e. the (x, y) coordinates and the heading of the vehicle 102) as a probability density. The odometry data is used for predicting the updated pose of the vehicle, and the environmental markers extracted from the laser scan can be compared with a known map and/or a list of dynamic landmarks maintained by the filter to correct for error in the vehicle pose.

If a vehicle parameter changes, a corresponding vehicle pose prediction correction that occurs during the update step will include a bias, which may be measured as a statistically significant variation observed error over time. A series of such corrections are stored in the mobile computer 104 and later analyzed in order to determine the vehicle parameter bias. For example, if laser scanner data indicates that the industrial vehicle has consistently travelled less than the distance measured by an odometry sensor, there is a likelihood that the wheel diameter decreased due to wearing of tread. The vehicle parameters also include sensor offset, vehicle height variation (e.g., tire pressure/tread changes), steering alignment variation, and so on. Errors in each of these sensors cause a characteristic error in the correction which may be modeled and compared with the actual corrections. These errors may not be related to the vehicle pose determination and but with other control systems.

During commissioning of the system 100, a map of the warehouse is created that provides feature sets that are expected to be seen by the sensor array at any position in the warehouse. As a result of vehicle usage, various vehicle parameters may change over time, e.g., tires wear, sensors move, steering components wear, and so on. The vehicle parameter change negatively influences derived measurements, for example odometry data associated with the industrial vehicle as well as data collected by other sensors. The data bias or drift in the derived measurement may be maintained as dynamic vehicle parameter. Over time, as the industrial vehicle 102 travels, observers feature information and executes tasks, the mobile computer 104 collects a series of error corrections made to a vehicle attribute, such as predicted pose derived from odometry when compared with the measured pose using a laser scanner. These error corrections are subject to statistical analysis looking for a characteristic disturbance. Such a disturbance may be a drift or jump that is characteristic of the measurement model for a particular parameter. The nature of the disturbance is correlated with the measurement model for a number of vehicle parameters to identify the error source. The mobile computer uses the measurement model for a particular sensor to determine the correction required to the parameter to eliminate the bias.

Figure 2:
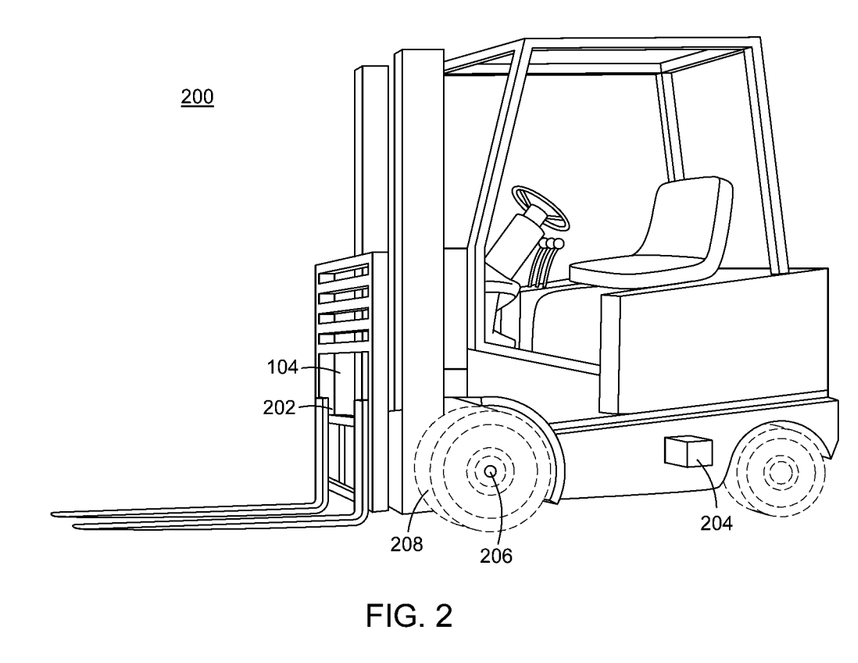
FIG. 2 illustrates a perspective view of the forklift for navigating a physical environment to perform various tasks according to one or more embodiments.

FIG. 2 illustrates a perspective view of the forklift 200 for facilitating automation of various tasks within a physical environment according to one or more embodiments of the present invention.

The forklift 200 (i.e., a lift truck, a high/low, a stacker-truck, trailer loader, sideloader or a fork hoist) is a powered industrial truck having various load capacities and used to lift and transport various objects. In some embodiments, the forklift 200 is configured to move one or more pallets (e.g., the pallets 112 of FIG. 1) of units (e.g., the units 114 of FIG. 1) along paths within the physical environment (e.g., the physical environment 100 of FIG. 1). The paths may be pre-defined or dynamically computed as tasks are received. The forklift 200 may travel inside a storage bay that is multiple pallet positions deep to place or retrieve a pallet. Oftentimes, the forklift 200 is guided into the storage bay and places the pallet on cantilevered arms or rails. Hence, the dimensions of the forklift 200, including overall width and mast width, must be accurate when determining an orientation associated with an object and/or a target destination.

The forklift 200 typically includes two or more forks (i.e., skids or tines) for lifting and carrying units within the physical environment. Alternatively, instead of the two or more forks, the forklift 200 may include one or more metal poles (not pictured) in order to lift certain units (e.g., carpet rolls, metal coils and/or the like). In one embodiment, the forklift 200 includes hydraulics-powered, telescopic forks that permit two or more pallets to be placed behind each other without an aisle between these pallets.

The forklift 200 may further include various mechanical, hydraulic and/or electrically operated actuators according to one or more embodiments. In some embodiments, the forklift 200 includes one or more hydraulic actuators (not labeled) that permit lateral and/or rotational movement of two or more forks. In one embodiment, the forklift 200 includes a hydraulic actuator (not labeled) for moving the forks together and apart. In another embodiment, the forklift 200 includes a mechanical or hydraulic component for squeezing a unit (e.g., barrels, kegs, paper rolls and/or the like) to be transported.

The forklift 200 may be coupled with the mobile computer 104, which includes software modules for operating the forklift 200 in accordance with one or more tasks. The forklift 200 is also coupled with an array comprising various sensor devices (e.g., the sensor array 108 of FIG. 1), which transmits sensor data (e.g., image data, video data, range map data and/or three-dimensional graph data) to the mobile computer 104 for extracting information associated with environmental features. These devices may be mounted to the forklift 200 at any exterior and/or interior position or mounted at known locations around the physical environment 100. Exemplary embodiments of the forklift 200 typically includes a camera 202, a planar laser scanner 204 attached to each side and/or an encoder 206 attached to each wheel 208. In other embodiments, the forklift 200 includes only the planar laser scanner 204 and the encoder 206. The forklift 200 may use any sensor array with a field of view that extends to a current direction of motion (e.g., travel forwards, backwards, fork motion up/down, reach out/in and/or the like). These encoders determine motion data related to vehicle movement. Externally mounted sensors may include laser scanners or cameras positioned where the rich data set available from such sensors would enhance automated operations. External sensors may include a limited set transponders and/or other active or passive means by which an automated vehicle could obtain an approximate position to seed a localization function. In some embodiments, a number of sensor devices (e.g., laser scanners, laser range finders, encoders, pressure transducers and/ or the like) as well as their position on the forklift 200 are vehicle dependent, and the position at which these sensors are mounted affects the processing of the measurement data. For example, by ensuring that all of the laser scanners are placed at a measurable position, the sensor array 108 may process the laser scan data and transpose it to a center point for the forklift 200. Furthermore, the sensor array 108 may combine multiple laser scans into a single virtual laser scan, which may be used by various software modules to control the forklift 200.

Figure 3:
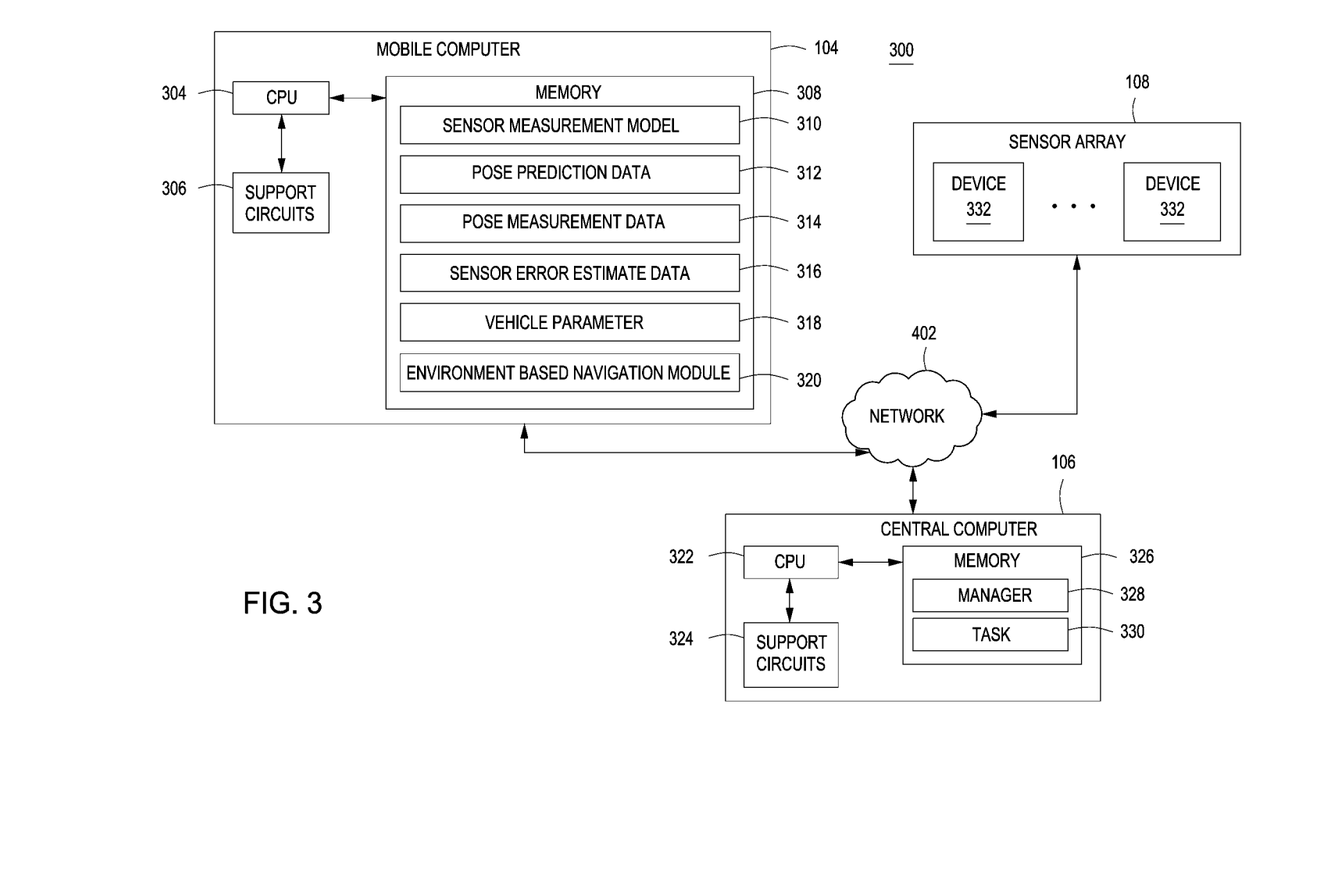
FIG. 3 is a structural block diagram of a system for automatically calibrating vehicle parameters according to one or more embodiments.

FIG. 3 is a structural block diagram of a system 300 for automatically calibrating vehicle parameters according to one or more embodiments. In some embodiments, the system 300 includes the mobile computer 104, the central computer 106 and the sensor array 108 in which each component is coupled to each other through a network 302.

The mobile computer 104 is a type of computing device (e.g., a laptop, a desktop, a Personal Desk Assistant (PDA) and the like) that comprises a central processing unit (CPU) 304, various support circuits 306 and a memory 308. The CPU 304 may comprise one or more commercially available microprocessors or microcontrollers that facilitate data processing and storage. Various support circuits 306 facilitate operation of the CPU 304 and may include clock circuits, buses, power supplies, input/output circuits and/or the like. The memory 308 includes a read only memory, random access memory, disk drive storage, optical storage, removable storage, and the like. The memory 308 includes various data, such as sensor measurement models 310, pose prediction data 312, pose measurement data 314, sensor error data 316 and vehicle parameters 318. The memory 308 includes various software packages, such as an environment based navigation module 320.

The central computer 106 is a type of computing device (e.g., a laptop computer, a desktop computer, a Personal Desk Assistant (PDA) and the like) that comprises a central processing unit (CPU) 322, various support circuits 324 and a memory 326. The CPU 322 may comprise one or more commercially available microprocessors or microcontrollers that facilitate data processing and storage. Various support circuits 324 facilitate operation of the CPU 322 and may include clock circuits, buses, power supplies, input/output circuits and/or the like. The memory 326 includes a read only memory, random access memory, disk drive storage, optical storage, removable storage, and the like. The memory 326 includes various software packages, such as a manager 328, as well as various data, such as a task 330.

The network 302 comprises a communication system that connects computers by wire, cable, fiber optic, and/or wireless links facilitated by various types of well-known network elements, such as hubs, switches, routers, and the like. The network 302 may employ various well-known protocols to communicate information amongst the network resources. For example, the network 302 may be part of the Internet or intranet using various communications infrastructure such as Ethernet, WiFi, WiMax, General Packet Radio Service (GPRS), and the like.

The sensor array 108 is communicable coupled to the mobile computer 104, which is attached to an automated vehicle, such as a forklift (e.g., the forklift 200 of FIG. 2). The sensor array 108 includes a plurality of devices 322 for monitoring a physical environment and capturing various data, which is stored by the mobile computer 104 as the sensor input messages 312. In some embodiments, the sensor array 108 may include any combination of one or more laser scanners and/or one or more cameras. In some embodiments, the plurality of devices 332 may be mounted to the automated vehicle. For example, a laser scanner and a camera may be attached to a lift carriage at a position above the forks. Alternatively, the laser scanner and the camera may be located below the forks. Alternatively, the laser scanner may be a planar laser scanner that is located in a fixed position on the forklift body where its field of view extends to cover the direction of travel of the forklift. The plurality of devices 332 may also be distributed throughout the physical environment at fixed and/or moving positions.

In some embodiments, the sensor parameter model data 310 includes a mathematical function expressing the relationship between readings from sensors 332, vehicle parameters 318 and sensor measurements such as odometry. Vehicle parameters 318 represent various physical characteristics related to the industrial vehicle 102, such as a wheel diameter. In this instance the sensor measurement model would represent the transform from encoders 206 coupled to each of the vehicle front wheels to odometry as v and w (being the linear and rotational velocity of the vehicle) using the vehicle parameters 318 being the wheel diameter D and wheel track L. In other instances measurement models may transform sensor readings such as fork height and steering arm extension into measurements used by the automation controller, vehicle height, steering angle, and/or the like. In some embodiments, the environment based navigation module 320 uses the sensor model 310 to determine a distance traveled using a product of the diameter D, $\pi$, and a number of wheel rotations over a particular time period.

In some embodiments, the pose prediction data 312 includes an estimate of vehicle position and/or orientation of which the present disclosure may refer to as the vehicle pose prediction. The environment based navigation module 320 may produce such an estimate using a prior vehicle pose in addition to the odometry data which is based sensor measurement model 310 and the measurement data from encoders. The environment based navigation module 320 may also estimate an uncertainty and/or noise for an upcoming vehicle pose prediction and update steps. Using odometry data, for example, the environment based navigation module 320 computes the distance traveled by the industrial vehicle 102 from a prior vehicle position. After subsequently referencing a map of the physical environment, the environment based navigation module 320 determines a new estimate of a current vehicle position. The difference between the new estimate and the pose prediction data represents an error in the prediction which may be due to a number of factors.

In some embodiments, the pose measurement data 314 includes an aggregation of data transmitted by the plurality of devices 332. In one embodiment, the one or more cameras transmit image data and/or video data of the physical environment that are relative to a vehicle. In some embodiments, sensor error estimate data 316 is an aggregation of corrections to the pose prediction data 312 in response to the pose measurement data 314 as explained further below. The sensor error estimate data 316 is used to identify trends in these corrections that are not a result of noise and/or uncertainty. For example, a steady, gradual increase in corrections positions estimated using odometry data indicates normal tire wear. The industrial vehicle 102 routinely falls short of the predicted vehicle pose because tread wear reduced the wheel diameter. Hence, the wheel diameter is inaccurate and the environment navigation module calculates a new value for the wheel diameter using the sensor measurement model 310 and stores this as an updated vehicle parameter. Other offsets in sensors, steering angle, vehicle height and the like cause a bias in other measured data which may be determined by computer modules other than the environment based navigation module 320. These biases can be indirectly or directly measured as described below.

In some embodiments, the environment based navigation module 320 includes software code (e.g., processor executable instructions) for automatically localizing the industrial vehicle 102 using features (e.g., geometric features and non-geometric features) that are observed from the physical environment 100. In some embodiments, the environment based navigation module 320 facilitates the improved localization of the industrial vehicle 102 by automatically calibrating vehicle parameters. In response the sensor error estimate data 316, the environment based navigation module 320 modifies the vehicle parameters 318 by correcting each and every biased vehicle parameter.

In some embodiments, the environment based navigation module 320 includes a filter (e.g., a process filter) for predicting the vehicle pose and then, updating the vehicle pose prediction based on measurements associated with the observed features.

Figure 4:
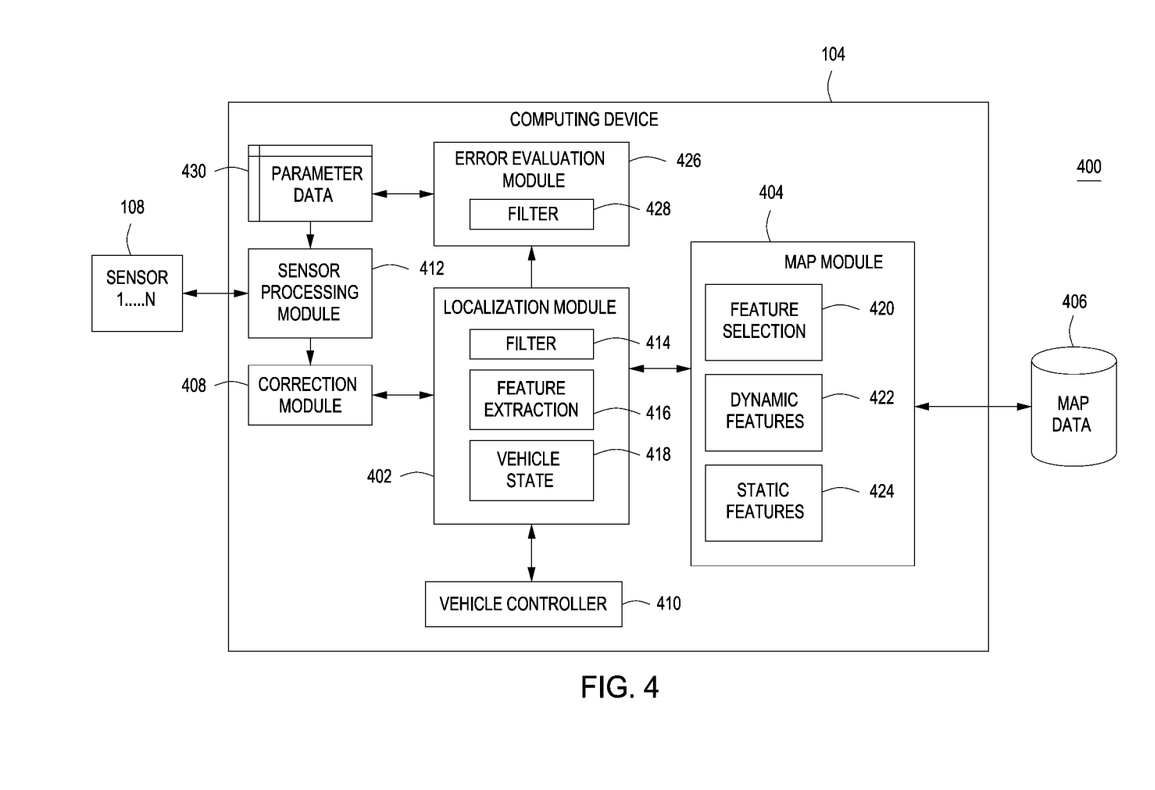
FIG. 4 is a functional block diagram of a system for automatically calibrating vehicle parameters according to one or more embodiments.

FIG. 4 is a functional block diagram of a system 400 for providing accurate localization for an industrial vehicle according to one or more embodiments. As described below with respect to this embodiment, parameter error evaluation is used to update (correct) the derived measurement, e.g. odometry, as well as improve the vehicle localization computation. However, in other embodiments, the corrected vehicle parameters may be used in other vehicle control modules to correct their operation. For example, odometry information together with localization information is used to as a control variable in numerous control systems, e.g. steering, velocity, that control the motion of the vehicle, i.e. drive a path. In some embodiments the path follower uses the odometry information to estimate the steering and velocity response required to maintain the vehicle on course. An error in the vehicle parameters used to calculate odometry from a sensor reading means that the path follower is continually fighting the steering control and velocity control to maintain the correct position. By using a corrected vehicle parameter as determined by EBN the overall control of the vehicle is improved.

Alternatively, modules other than EBN may develop error estimates on measurements derived from other sensors readings using which other vehicle parameters are corrected. For example the executor module is responsible for requesting fork movements on the vehicle. These fork movements, such as fork height, are performed by the vehicle controller. The load sensing unit, described in commonly assigned U.S. patent application Ser. No. 12/718,620, filed Mar. 5, 2010, which is herein incorporated by reference in its entirety, provides an independent measurement of fork height. Thus, the system may use both a direct measurement and an indirect measurement of fork height both of which are subject to noise. These two measurements can be analyzed using a method analogous to that described below. To determine a bias in a measurement created by the fork height sensor. During operation of the vehicle, the chain that couples the carriage to the hydraulic actuators is subject to stretch. Such chain stretch causes an error in the height of the carriage. By modeling chain stretch in the control system and determining a systematic correction that is applied by an independent measurement made from the product sensing laser and camera, the height controller may be recalibrated and the performance of the vehicle optimized.

The system 400 includes the mobile computer 104, which couples to an industrial vehicle, such as a forklift, as well as the sensor array 108. Various software modules within the mobile computer 104 collectively form an environment based navigation module (e.g., the environment based navigation module 320 of FIG. 3).

The mobile computer 104 includes various software modules (i.e., components) for performing navigational functions, such as a localization module 402, a map module 404, a correction module 408, a vehicle controller 410, an error evaluation module 426, vehicle parameter data 430 and a sensor processing module 412. The mobile computer 104 provides accurate localization for the industrial vehicle and updates map data 406 with information associated with environmental features. The localization module 402 also includes various components, such as a filter 414 and a feature extraction module 416, for determining a vehicle state 418. The map module 404 includes various data, such as dynamic features 422 and static features 424. The map module 404 also includes various components, such as a feature selection module 420.

In some embodiments, the sensor processing module 412 transforms the sensor reading to a measurement used for navigation and sends the measurement to correction module 408. The sensor processing module 412 uses a sensor model [f(s,p)] expresses the relationship between the sensor readings, the vehicle parameters and the system measurement. For example, to develop odometry from an encoder, the model is:

$$v(t) \text{ (linear velocity)} = (\pi D_1 E_1(t) + \pi D_2 E_2(t))/2; \text{ and}$$

$$\omega(t) \text{ (angular velocity)} = (\pi D_1 E_1(t) - \pi D_2 E_2(t))/L$$

Where vehicle parameters are $D_1$, $D_2$ & L are respectively the diameters of the wheels and vehicle track; $E_1(t)$, $E_2(t)$ are the encoder readings; and $v(t)$, $\omega(t)$ is the odometry system measurement. It is to be expected that the correction module 408 processes one or more sensor input data messages and examines observed sensor data therein. The correction module 408 eliminates motion and/or time distortion artifacts prior to being processed by the filter 414.

In some embodiments, the correction module 408 inserts the one or more sensor input data messages into a queue. The correction module 408 subsequently corrects the sensor input messages based on the correction information from bias derivation module 426. Other corrections may be performed as described in U.S. patent application Ser. No. 13/116,600, filed May 26, 2011, which is hereby incorporated by reference in its entirety. When a sensor input message becomes available to the correction module 408, a filter update process is performed on the queue by the localization module 402, which integrates remaining sensor data into the pose measurements to determine a current vehicle pose.

In addition to the filter 414 for calculating the vehicle state 418, the localization module 402 also includes the feature extraction module 416 for extracting known standard features from the corrected sensor data. The map module 404 compares the vehicle state 418 with the dynamic features 422 and/or the static features 424 in order to eliminate unrelated features, which reduce a total number of features to examine. The feature selection module 420 manages addition and modification of the dynamic features 422 to the map data 406. The feature selection module 420 can update the map data 406 to indicate areas recently occupied or cleared of certain features, such as known placed and picked items.

After comparing these pose measurements with a pose prediction, the filter 414 corrects the pose prediction to account for an incorrect estimation, observation uncertainty, and vehicle parameter bias, and updates the vehicle state 418. The filter 414 determines the vehicle state 418 and instructs the mapping module 404 to update the map data 406 with information associated with the static features 424 and the dynamic features 422. The vehicle state 418, which is modeled by the filter 414, refers to a current vehicle state and includes data that indicate vehicle position (e.g., coordinates) and/or orientation (e.g., degrees) as well as movement (e.g., vehicle velocity, acceleration and/or the like). The localization module 408 communicates data associated with the vehicle state 418 to the mapping module 404 while also communicating such data to the vehicle controller 410. Based on the vehicle position and orientation, the vehicle controller 410 navigates the industrial vehicle to a destination.

The filter 414 is typically a Kalman filter (or extended Kalman filter) that, in one embodiment, provides an estimate of the vehicle position by modeling the noise on the respective sensor readings that are used to create the position. This position is developed as effectively two measurements one from the odometry and one from the lasers. While each of these positions may be noisy, the noise will typically be a zero mean Gaussian signal. The set of position estimates may be passed to the error evaluation module 426 where systematic errors in the measurements are analyzed. The error evaluation module 426 may use a process filter (Kalman filter) 428 to evaluate the measurement provided by the localization module and provide an estimate of the drift between the two measurement estimates.

In evaluating the systematic error in the two measurements the error evaluation module 426 considers changes models associated with the parameter data 430. For example, in the case of odometry, the expected model is a gradual change due to tire wear that may be detected as an increasing bias between the laser derived position and the odometry derived position. In this case, the error evaluation module 426 evaluates the difference looking for a statistically significant bias and, using this bias, determines new wheel diameters that would remove the bias.

Other error models may involve sudden changes in the bias. This may occur, for example, when a laser mounting is knocked and the laser position changes. Here, the error evaluation model 426 looks as the position derived from multiple planar laser sensors as well as the odometry information to determine which laser has moved and develop a corrected position for the laser.

It is appreciated that the system 400 may employ several computing devices to perform environment based navigation. Any of the software modules within the computing device 104 may be deployed on different or multiple physical hardware components, such as other computing devices. The mapping module 404, for instance, may be executed on a server computer (e.g., the central computer 102 of FIG. 1) over a network (e.g., the network 402 of FIG. 4) to connect with multiple mobile computing devices for the purpose of sharing and updating the map data 406 with a current vehicle position and orientation.

In some embodiments, the correction module 408 processes sensor input messages from disparate data sources, such as the sensor array 108, having different sample/publish rates for the vehicle state 418 as well as different (internal) system delays. Due to the different sampling periods and system delays, the order at which the sensor input messages are acquired is not the same as the order at which the sensor input messages eventually became available to the computing device 104. The feature extraction module 416 extracts observed pose measurements from the sensor data within these messages. The localization module 402 examines each message separately in order to preserve the consistency of each observation. Such an examination may be performed instead of fusing the sensor data to avoid any dead reckoning errors.

Figure 5:
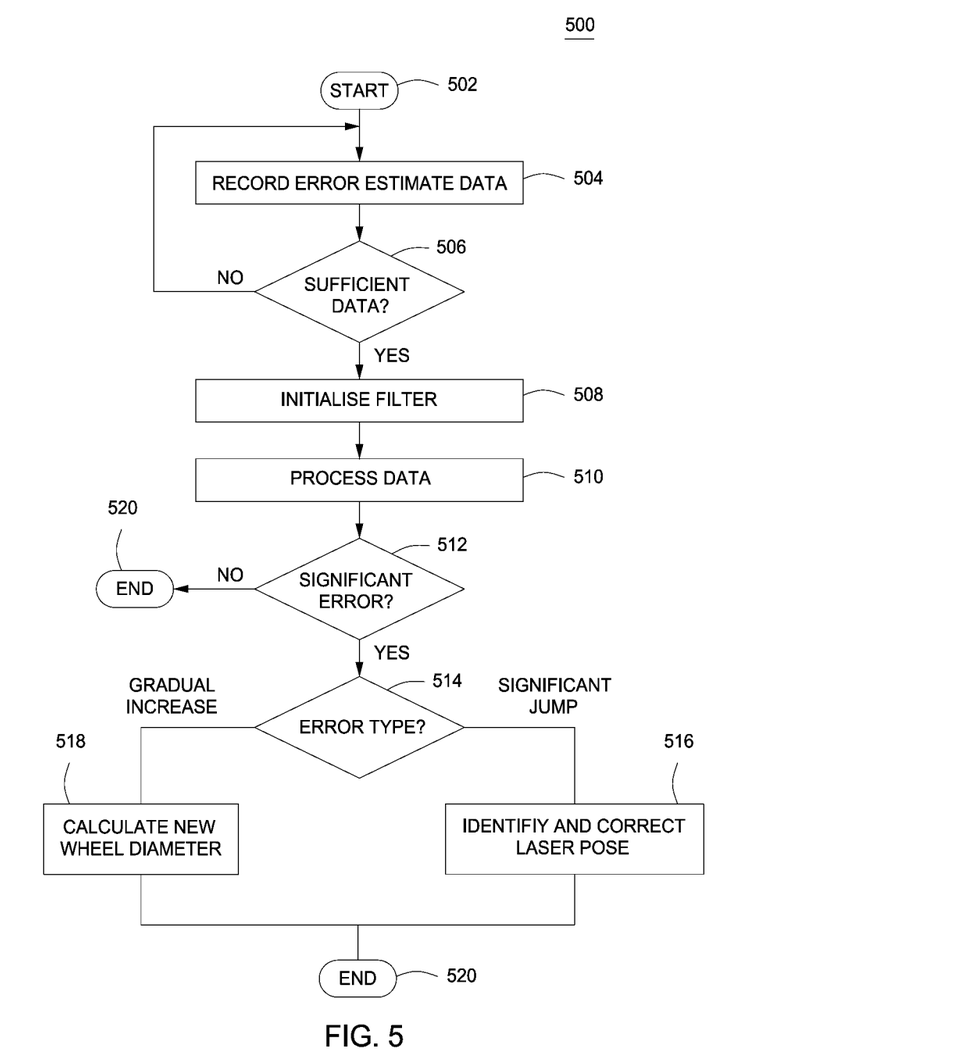
FIG. 5 is a flow diagram of a method for automatically calibrating vehicle parameters according to one or more embodiments.

FIG. 5 is a flow diagram of a method 500 for automatically calibrating vehicle parameters associated with industrial vehicle operation according to one or more embodiments. The method 500 is an exemplary embodiment of an implementation of the error evaluation module 426 of FIG. 4. In some embodiments, the error evaluation module 426 is a subcomponent of the environment based navigation module (module 320 in FIG. 3). In other embodiments, the error evaluation module 426 is an independent module that modifies vehicle parameters used in the navigation process as well as other vehicle parameters. The method 500 performs each and every step of the method 500. In other embodiments, some steps are omitted or skipped.

The method operates by analyzing the error in a system measurement (e.g. distance travelled, velocity, forks height), which comprises an actual value, y, and measured/observed value, ŷ. Frequently the actual value is not directly observable and the best estimate may be obtained is a using noisy sensor readings, $s=\{s_1, s_2, \ldots, s_n\}$ in a measurement model $\hat{y}=f(s, p)$ where $p=\{p_1, p_2, \ldots p_m\}$ is the list of parameters (first set of parameters) which relates a sensor reading to a system measurement. The value ŷ is referred to as the observed measurement. The actual measurement error, $e=y-\hat{y}$ is a zero mean Gaussian random variable given correct parameters, p, and that the noise components in sensor readings also has zero-mean. Since the value y cannot be observed directly, the only way to detect a change in a parameter is using another set of parameters (a second set of parameters) with another measurement model that estimates the same measurement. The auxiliary measure may not be suitable as a main measurement (e.g. larger noise components) or may be used in conjunction with other measurement models to eliminate measurement error. Hence, we have two observed measurements: $\hat{y}_1=f(s_1, p_1)$ and $\hat{y}_2=f(s_2, p_2)$. The difference between the two observed measurements, $\epsilon=\hat{y}_1-\hat{y}_2$, shall also be a zero mean Gaussian, given both measurement modules have the correct parameters. We will refer to this error as observed error to distinguish it from actual measurement error, a Over a period of time, the attributes represented by the parameters may have changed due to normal wear (e.g. tire diameter decrease over time, a carriage coupling cable stretches over time, etc.), or external factor (e.g. laser has been moved slightly). The parameters defined in the system will therefore be no longer accurate and this will cause the observed error, $\epsilon$, to contain a bias (i.e. no longer be zero mean) and the parameters of the measurement model can be adjusted accordingly.

The method 500 starts at step 502 and proceeds to step 504. At step 504, the method accesses error data provided by operational modules such as the localization module 402 of FIG. 4. Data to be analyzed by the method 500 must include two independent measures of a vehicle parameter such as vehicle pose. In order to perform the evaluation, the method requires sufficient data to observe a trend in the data. The individual data items are stored. At step 506, the method determines whether there is sufficient data to perform an analysis. If there is insufficient data the method returns to step 504. Those skilled in the art will understand that the collection of data may include some selection of the data. For example, it is simpler to detect a bias in odometry when the vehicle is driving in a straight line; thus, the step 504 may include selection of appropriate data for analysis.

At step 508, the method initializes a filter to analyze the data for a particular measurement. The type of filter used will be dependent on the vehicle measurement being analyzed. In many cases, a Kalman filter is an appropriate choice for evaluation of the parameter. The vehicle parameter to be analyzed may be incorporated into the filter together with the measurement data. At step 508, the method plays the recorded data into the filter to perform the analysis.

At step 510, the method analyses the output of the filter to determine if there is a significant error. If no significant error exists the method terminates at step 520. Otherwise the method evaluates the type of error observed. Where the data is associated with localization two types of error are evaluated one, an error caused by tire wear which will have a characteristic gradual increase in error and the other associated with the displacement of a laser which will result in a step increase. A gradual increase is processed by step 518 where a new wheel diameter is calculate for each encoder wheel and stored as a new system parameter. A step change is processed in step 516 where the pose of the appropriate laser is adjusted. The method terminates at step 520. Various elements, devices, and modules are described above in association with their respective functions. These elements, devices, and modules are considered means for performing their respective functions as described herein.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method of automatically calibrating a vehicle parameter of an automated industrial vehicle, the method comprising:
    operating the automated industrial vehicle over a period of time that is sufficient for a vehicle parameter to change due to an external factor or normal wear of a component of the industrial vehicle, wherein the vehicle parameter represents a physical characteristic related to the industrial vehicle;
    analyzing error in a system measurement comprising an actual value y that is not directly observable and an observed value ŷ, wherein the observed value ŷ is obtained using noisy sensor readings from two different measurement models $\hat{y}_1, \hat{y}_2$, wherein
    $\hat{y}_1=f(s_1, p_1)$,
    $\hat{y}_2=f(s_2, p_2)$,
    $s_1$ and $s_2$ represent first and second sets of noisy sensor readings from two independent measures of the vehicle parameter from disparate data sources, and
    $p_1$ and $p_2$ represent first and second sets of parameters that relate the first and second sets of noisy sensor readings from the two independent measures of the vehicle parameter to the system measurement;
    adjusting the first and second sets of parameters $p_1$ and $p_2$ using an observed error represented by a difference between observed values from the two different measurement models $\hat{y}_1, \hat{y}_2$; and
    associating vehicle operation with the adjusted parameters and operating the industrial vehicle according to the association.

2. The method of claim 1 wherein:
    the automated industrial vehicle is operated over a period of time that is sufficient for a difference between observed values from the two different measurement models $\hat{y}_1, \hat{y}_2$, to yield a non-zero mean observed error $\epsilon=\hat{y}_1-\hat{y}_2$; and
    the first and second sets of parameters $p_1$ and $p_2$ are adjusted to return the observed error $\epsilon=\hat{y}_1-\hat{y}_2$ to zero mean.

3. The method of claim 2, wherein the non-zero mean observed error $\epsilon$ represents a vehicle parameter bias that comprises at least one of a wheel diameter bias, a wheel slip bias, sensor offset, vehicle height variation, or steering alignment variation.

4. The method of claim 1, wherein the vehicle parameter is selected from at least one of wheel diameter, sensor offset, vehicle height, steering alignment, and wheel track.

5. The method of claim 1 wherein the automated industrial vehicle is operated over a period of time that is sufficient for the first and second sets of noisy sensor readings from the two independent measures of the vehicle parameter to comprise sufficient data to observe a trend in the data.

6. The method of claim 5 wherein:
the method comprises characterizing the observed trend in the data as a drift or a jump; and
correlating the drift or jump with one of a number of vehicle parameters to identify an error source.

7. The method of claim 6 wherein the method comprises:
correlating a drift in the data with vehicle wear as the error source; and
correlating a jump in the data with data sensor displacement as the error source.

8. The method of claim 7 wherein the vehicle wear comprises a change in wheel diameter and the data sensor displacement comprises a change in laser pose.

9. The method of claim 1 wherein:
the automated industrial vehicle is operated over a period of time that is sufficient to permit selection of appropriate analysis data from the first and second sets of noisy sensor readings; and
the first and second sets of parameters $p_1$ and $p_2$ are adjusted using a selection of appropriate analysis data from the first and second sets of noisy sensor readings.

10. The method of claim 9 wherein the appropriate analysis data is selected from the first and second sets of noisy sensor readings to represent data collected when the industrial vehicle is driving in a straight line.

11. The method of claim 1 wherein the first and second sets of noisy sensor readings are taken from a sensor array comprising one or more cameras.

12. The method of claim 11 wherein the one or more cameras are mounted externally on the industrial vehicle.

13. The method of claim 11 wherein the sensor array further comprises one or more laser scanners, one or more encoders coupled to one or more wheels of the industrial vehicle, a fork height sensor, or a steering angle sensor.

14. The method of claim 1 further comprising navigating the industrial vehicle using the adjusted parameters.

* * * * *